United States Patent [19]

Kitamura

[11] Patent Number: 4,963,776
[45] Date of Patent: Oct. 16, 1990

[54] VEHICULAR A.C. GENERATOR HAVING IMPROVED COOLING STRUCTURE

[75] Inventor: Yutaka Kitamura, Himeji, Japan

[73] Assignee: Mitsubishi Denki Kabushiki Kaisha, Tokyo, Japan

[21] Appl. No.: 305,042

[22] Filed: Feb. 2, 1989

[30] Foreign Application Priority Data

Feb. 3, 1988 [JP] Japan .................. 63-24303

[51] Int. Cl.⁵ ............................. H02K 9/22
[52] U.S. Cl. ...................... 310/64; 310/43; 310/258
[58] Field of Search .............. 310/42, 43, 45, 52, 310/54, 58, 64, 62, 63, 68 D, 258, 89, 263, 179, 254, 180; 29/596

[56] References Cited

U.S. PATENT DOCUMENTS

| | | | |
|---|---|---|---|
| 2,668,925 | 2/1954 | Bloser | 310/43 |
| 2,752,857 | 7/1956 | White | 310/43 UX |
| 3,075,250 | 1/1963 | Strohm et al. | 29/596 |
| 3,192,861 | 7/1965 | Haegh | 310/52 |
| 3,688,137 | 8/1972 | Filhol | 310/43 |
| 4,262,224 | 4/1981 | Kofink et al. | |
| 4,295,067 | 10/1981 | Binder et al. | |
| 4,404,055 | 9/1983 | McCarty | 310/258 |
| 4,492,884 | 1/1985 | Asano et al. | 310/45 |
| 4,607,181 | 8/1986 | Smith | 310/64 |
| 4,739,204 | 4/1988 | Kitamura et al. | |
| 4,818,906 | 4/1989 | Kitamura et al. | 310/68 D |

FOREIGN PATENT DOCUMENTS

| | | |
|---|---|---|
| 0231785 | 12/1987 | European Pat. Off. |
| 1867072 | 12/1962 | Fed. Rep. of Germany |
| 2343070 | 3/1975 | Fed. Rep. of Germany |
| 0178137 | 8/1987 | Japan |
| 2117187 | 5/1983 | United Kingdom |

OTHER PUBLICATIONS

Japanese Patent Abstract–vol. 8, No. 194; Sep., 1984.

Primary Examiner—R. Skudy
Attorney, Agent, or Firm—Sughrue, Mion, Zinn, Macpeak & Seas

[57] ABSTRACT

A vehicular a.c. generator comprising a housing having a cooling surface, a rotor rotatably supported within the housing, a stator with a coil end supported by the housing to have a clearance therebetween, and a thermally conductive filling material filled in the clearance for conducting heat from the stator coil end to the housing. The housing is provided with a filler passage communicating the clearance to the exterior of the housing for introducing therethrough the filling material into the clearance. Therefore, the filling material is injected through the filler passage into the clearance after the stator is assembled into the housing.

11 Claims, 4 Drawing Sheets

VEHICULAR A.C. GENERATOR HAVING IMPROVED COOLING STRUCTURE

BACKGROUND OF THE INVENTION

This invention relates to a vehicular a.c. generator and a manufacturing method therefor and more particularly to a vehicular a.c. generator which is mounted on a vehicle such as an automobile for a.c. generation by the power from an engine and a manufacturing method therefor.

The vehicular a.c. generator of this kind has been known as disclosed in Japanese Patent Laid-Open No. 62-178137. However, the conventional vehicular a.c. generator is complex in structure for cooling a rear bracket with a cooling liquid and requires a number of seals that need sophisticated sealing techniques and troublesome operations. In order to dissolve this problem, a vehicular a.c. generator of the structure shown in FIG. 1 is proposed. This generator is not a prior art.

A vehicular a.c. generator 1 shown in FIG. 1 comprises a rear bracket 2a having formed inside of it an annular surrounding groove 4 which defines a gap or clearance together with an outer periphery of a rear coil end 3a of a stator 3. The gap is filled with an electrically insulating filling material 5 of a good thermal conductivity and a cooling cover 6 is liquid-tightly attached to the outer end of the rear bracket 2a. Then, a cooling cover 6 is liquid-tightly attached to the outer end of the rear bracket 2a to define a cooling liquid passage 7 therebetween through which a cooling liquid is introduced from the exterior and passed through the flow passage 7 and discharged into the exterior, thereby to cool the rear coil end 3a of the stator 3, excitation iron core 8 mounted to the inner wall portion of the rear bracket 2a and a rectifier 9, a voltage regulator 10 and the like attached to the outer surface of the cooling cover 6.

In FIG. 1, reference numeral 2b is a front bracket, 3b is a front coil end, 3c is a core of the stator 3, 11 is a rotary shaft, 12 is a rotor secured on the rotary shaft 11, 13 is a field coil, 14 is a front centrifugal cooling fan attached to the side surface of the front side of the rotor 12, 15 is pulley secured on the front end of the rotary shaft 11, 16 is a bolt for securing the excitation iron core 8 to the inner wall portion of the rear bracket 2a, and 17 is a coolant outlet pipe in communication with the flow path 7. Also, the previously-mentioned rectifier 9, which converts an output current due to an a.c. voltage induced in the coil of the stator 3 into a direct current, is mounted to the cooling cover 6 through a heat sink 9a. Further, voltage regulator 10 which detects a generator voltage, controls the excitation current and regulate the terminal voltage to a predetermined value is mounted to the cooling cover 6 through a heat sink 10a.

In the above-described vehicular a.c. generator 1, the filling of the filler material 5 into the gap between the annular surrounding groove 4 formed in the rear bracket 2a and the outer periphery of the rear coil end 3a of the stator 3 has been conducted as follows.

That is, an appropriate amount of the filling material is applied to the outer periphery of the rear coil end 3a before assembly, and then this is inserted into the annular surrounding groove 4 of the rear bracket 2a, thereby filling the gap around the rear coil end with the filling material.

However, with the method for filling the filling material as discussed above, it has been difficult to evenly apply the filling material to the rear coil end, often forming cavities 18 due to insufficient or improper filling as shown in FIG. 1, resulting in a significant degrading of the cooling efficiency. Also, during insertion of the rear coil end into the annular surrounding groove of the rear bracket with the filling material applied on the rear coil end, the filling material applied on the rear coil end adheres to spigot joints in which dimensional precision is required, making proper fitting of the joints difficult.

SUMMARY OF THE INVENTION

Accordingly, an object of the present invention is to provide a vehicular a.c. generator and a manufacturing method therefor in which the above problems are eliminated.

Another object of the present invention is to provide a vehicular a.c. generator and a manufacturing method therefor in which a stator coil can be efficiently cooled.

Another object of the present invention is to provide a vehicular a.c. generator and a manufacturing method therefor in which the gap defined between the outer circumferential surface of the rear coil end and the annular surrounding groove in the inner circumferential surface of the bracket can be substantially completely filled with a filling material of a good thermal conductivity without introducing any cavities.

Still another object of the present invention is to provide a vehicular a.c. generator and a manufacturing method therefor in which no improper fitting of the joints due to excessive filling material undesirably adhered to the joint occurrs.

With the above objects in view, the present invention resides in a vehicular a.c. generator comprising a housing having a cooling surface, a rotor rotatably supported within the housing, a stator supported by the housing to be disposed around the rotor, the stator having a coil end substantially spaced apart from the housing to define a clearance therebetween, and a thermally conductive filling material filled in the clearance between the stator coil end and the housing for efficiently conducting heat generated in the stator coil end to the housing, the housing having a filler passage communicating the clearance to the exterior of the housing for introducing therethrough the filling material into the clearance.

The housing may comprise two opposed, substantially cup-shaped housing sections each having a substantially cylindrical wall having an open end and a closed end, the stator being supported by the open ends of the housing sections, and the clearance filled with the filling material is a substantially annular space defined between the stator coil end and the cylindrical wall and the closed end of the housing section.

The present invention also resides in a method for assembling a vehicular a.c. generator having a housing having a cooling surface, a rotor rotatably supported within the housing, a stator with a coil end supported by the housing to have a clearance therebetween, and a thermally conductive filling material filled in the clearance for conducting heat from the stator coil end to the housing, the method comprising the steps of: forming a filler passage in the housing, the filler passage communicating the clearance to the exterior of the housing for introducing therethrough the filling material into the clearance; assembling the stator into the housing; and injecting a thermally conductive filling material through the filler passage to fill the clearance.

With the vehicular a.c. generator of the present invention, the stator is assembled into the cup-shaped rear bracket which is one of the housing sections so that a gap or clearance is defined between the outer periphery of the coil end on the rear side and an annular surrounding groove formed in the inner periphery of the bracket, and thereafter, a nozzle of a filling material injection device is inserted into a passage communicating with the clearance formed between the outer periphery of the coil end of the stator and the inner periphery of the bracket, a filling material having a good thermal conductivity is filled into the gap, and other components are assembled to obtain a final product of a generator. Thus, according to the present invention, a portion into which an injection nozzle of a filling material injection apparatus can be inserted and which is a filler passage communicating with the above-mentioned gap is formed in the rear bracket, and thereafter the gap is filled with a filling material, so that no cavities generate in the filling material filled in the gap, allowing the heat generated by the stator coil to be efficiently conducted to the rear bracket and dissipated to the exterior by a cooling liquid which cools the housing.

BRIEF DESCRIPTION OF THE DRAWINGS

The present invention will become more readily apparent from the following detailed description of the preferred embodiemnts of the present invention taken in conjuenction with the accompanying drawings, in which.

DESCRIPTION OF THE PREFERRED EMBODIMENTS

The vehicular a.c. generator and the manufacturing method therefor of the present invention will now be described in more detail in terms of the embodiments shown in the accompanying drawings.

Figure 1:
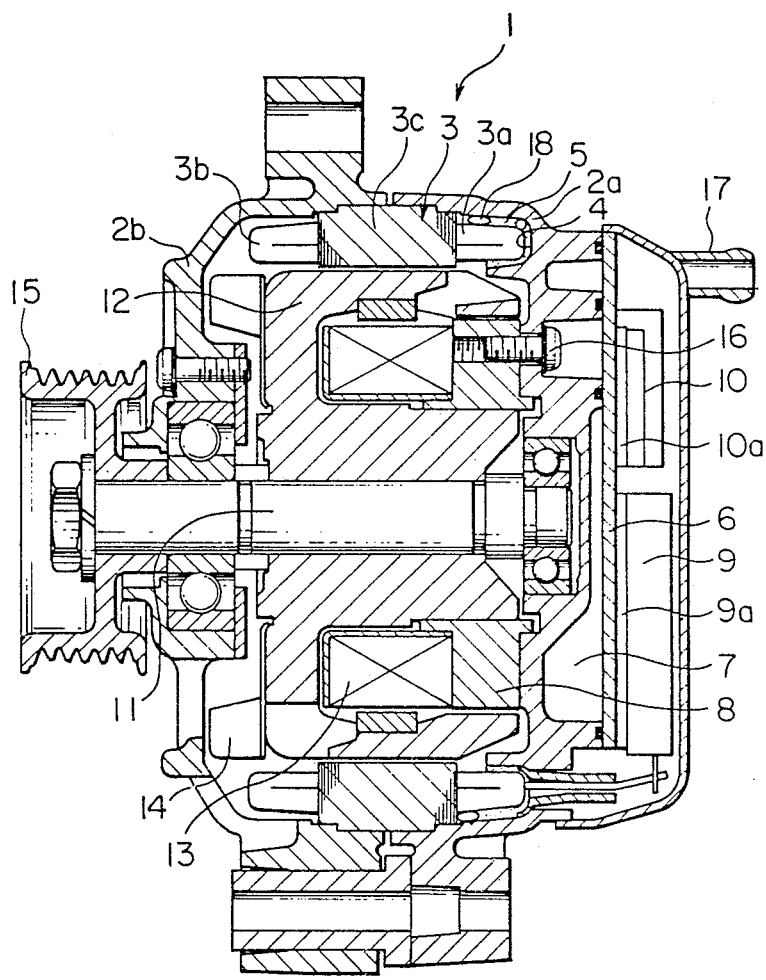
FIG. 1 is a sectional view of a related vehicular a.c. generator.
Figure 2:
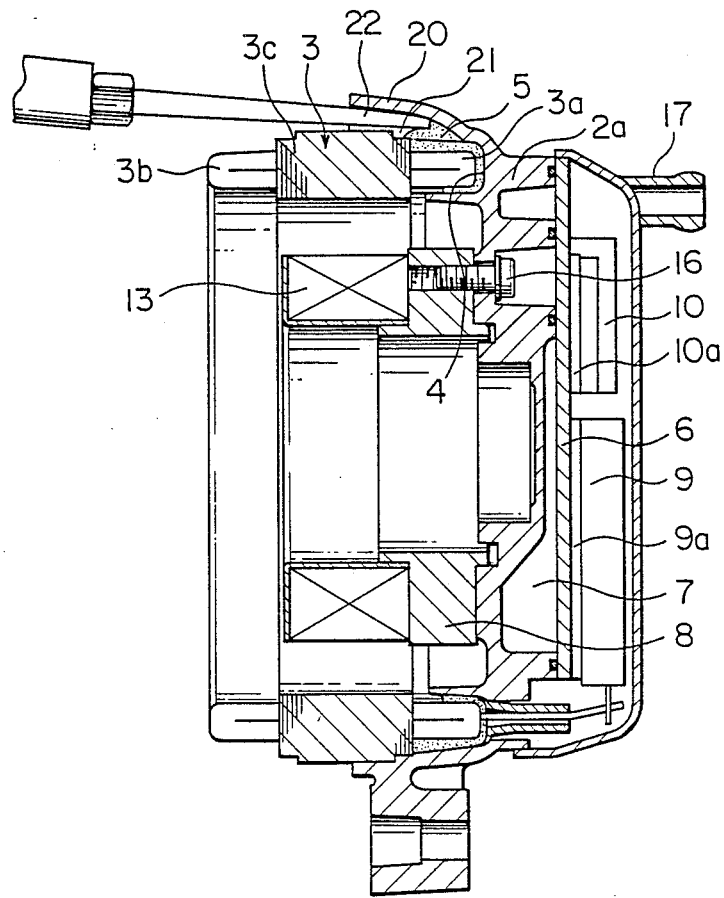
FIG. 2 is a sectional view of a vehicular a.c. generator of one embodiment of the present invention during its assembly.

FIG. 2 shows a vehicular a.c. generator of the first embodiment of the present invention while it is being manufactured. In FIG. 2 which shows the generator during its assembly, the components which are identical or corresponding to those of the vehicular a.c. generator 1 shown in and explained in conjunction with FIG. 1 are assigned with identical reference characters and their explanations are omitted. In the vehicular a.c. generator of this embodiment, a plurality of outwardly expanded tunnels 20 are formed on the periphery of the open end of the cup-shaped rear bracket 2a which is one of housing sections at equal circumferential intervals so as to define a space or a passage 21 therein. This passage 21 is in communication with the annular clearance defined between the outer circumference of the rear coil end 3a of the stator 3 and the annular surrounding groove 4 of the rear bracket 2a.

Since the outwardly expanded hollow tunnel 20 is disposed on the outer periphery of the open end of the rear bracket 2a, the passage 21 opens toward the open side during the assembly of the a.c. generator as shown in FIG. 2. Therefore, an injection nozzle 22 of a filling material injection apparatus (not shown) can be inserted into the filler passage 21. Then, an electrically insulating, thermally conductive filling material 5 such as a mixture of silicone and alumina powder is injected into the previously-described annular clearance to fill it through the filler passage 21. According to this process, the clearance defined between the annular surrounding groove 4 of the rear bracket 2a and the outer circumference of the rear coil end 3a of the stator 3 is completely filled with the filling material 5 and no cavity is formed therein. Therefore, the heat generated by the stator coil can be efficiently conducted to the rear bracket 2a where the heat is removed by a cooling liquid flowing through the flow path 7 defined along the rear end surface of the rear bracket 2a.

Figure 3:
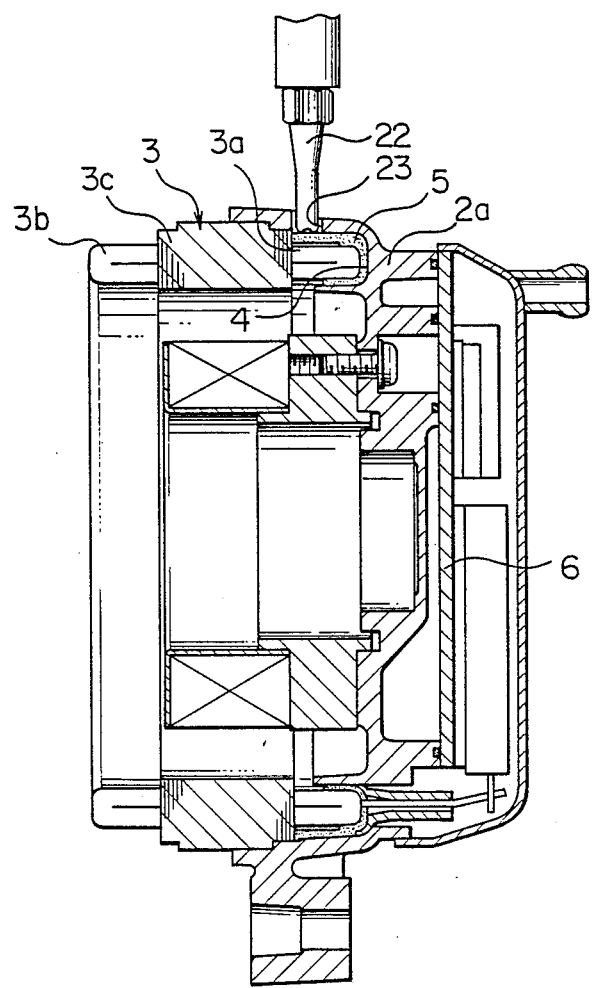
FIG. 3 is a sectional view of a vehicular a.c. generator of another embodiment of the present invention during its assembly.

FIG. 3 illustrates a vehicular a.c. generator of the second embodiment of the present invention during its assembly.

In the vehicular a.c. generator of the second embodiment of the present invention, the rear bracket 2a has a plurality of holes 23 on its cylindrical wall. The holes 23 communicates with the annular clearance defined between the outer periphery of the rear coil end 3a and the annular surrounding groove 4 formed in the inner cirumferential surface of the rear bracket 2a. The holes 23 may be formed by a molding die or machining. It is preferable that these holes 23 are provided in the cylindrical wall of the rear bracket 2a in the vicinity of the root portion of the stator coil end 3a as shown in FIG. 3.

During the assembly of the vehicular a.c. generator, the filling material 5 is injected into the gap by the filling material injecting apparatus through the nozzle 22 inserted into the holes 23. Therefore, the filling material 5 completely fills the gap without forming any voids therein.

Figure 4:
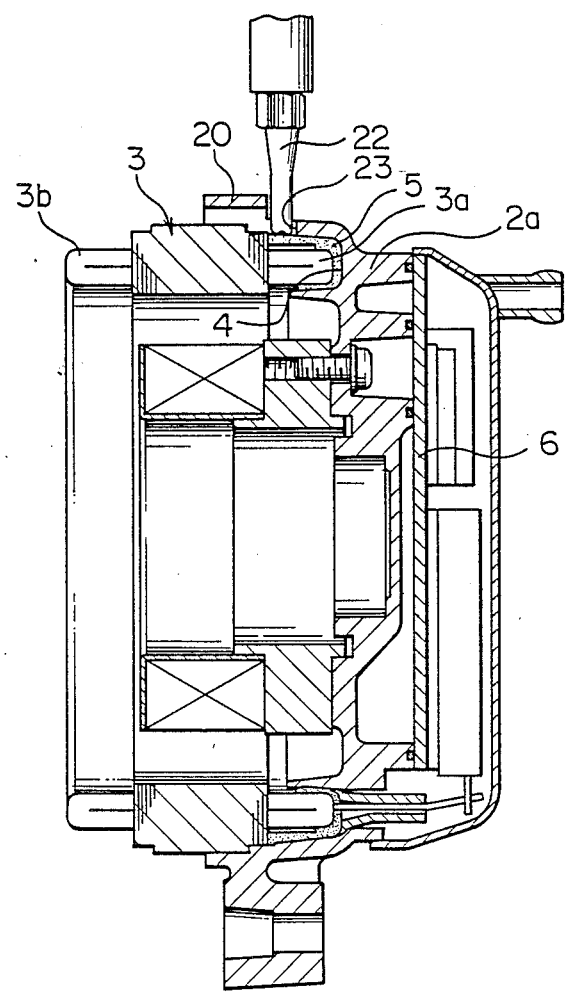
FIG. 4 is a sectional view of a vehicular a.c. generator of a further embodiment of the present invention during its assembly.

FIG. 4 illustrates a vehicular a.c. generator of the third embodiment of the present invention during its assembly. In the third embodiment of the invention, the rear bracket 2a is provided with the hollow tunnels 20 described in connection with the first embodiment shown in FIG. 2 as well as holes 23 explained in connection with the second embodiment shown in FIG. 3. With this embodiment, the injection nozzle 22 of the filling material injection apparatus can be inserted into any place suitable for filling the gap with the filling material 5.

As has been described, according to the vehicular a.c. generator of the present invention, an annular clearance is defined between the outer periphery of the coil end on the rear side and an annular surrounding groove formed in the inner periphery of the bracket, and thereafter, a filling material is injected through a filler passage into the annular clearance to fill it, so that no cavity generates in the filling material filled in the gap, allowing the heat generated by the stator coil to be efficiently conducted to the rear bracket and dissipated to the exterior by a cooling liquid which cools the cooling surface of the rear bracket, and since the filling material is injected after the spigot joint between the stator and the bracket is joined, no filling material adheres to the joints, making the assembly easier.

What is claimed is:

1. A vehicular a.c. generator comprising:
   a housing having a cooling surface;
   a rotor rotatably supported within said housing;
   a stator supported by said housing to be disposed around said rotor, said stator having a coil end substantially spaced apart from said housing to define a clearance therebetween; and
   a thermally conductive filling material filled in said clearance between said stator coil end and said housing for efficiently conducting heat generated in said stator coil end to said housing;
   said housing having at least one filler passage means communicating said clearance to the exterior of said housing for introducing therethrough said filling material into said clearance and for completely filling said clearance from said exterior once said filling material has been filled in said clearance.

2. A vehicular a.c. generator as claimed in claim 1, wherein said housing comprises two opposed, substantially cup-shaped housing sections each having a substantially cylindrical wall having an open end and a closed end, said stator being supported by said open ends of said housing sections, and said clearance filled with said filling material is a substantially annular space defined between said stator coil end and said cylindrical wall and said closed end of at least one of said housing sections.

3. A vehicular a.c. generator as claimed in claim 1, wherein said filler passage communicates a root portion of said stator coil end projecting from said stator.

4. A vehicular a.c. generator as claimed in claim 1, wherein said filler passage extends substantially axially in said housing.

5. A vehicular a.c. generator as claimed in claim 4, wherein said filler passage is defined by an axial tunnel radially outwardly expanded from said housing.

6. A vehicular a.c. generator as claimed in claim 1, wherein said filler passage extends substantially radially in said housing.

7. A vehicular a.c. generator as claimed in claim 6, wherein said filler passage is defined by a radial hole extending through said housing.

8. A vehicular a.c. generator as claimed in claim 1, wherein said filler passage is shaped to receive a filling material injection nozzle inserted therein.

9. A vehicular a.c. generator as claimed in claim 1, wherein at least two filler passages are formed at circumferentially spaced positions along an open end of said housing section.

10. A vehicular a.c. generator as claimed in claim 2, wherein said housing includes both an axial filler passage and a radial filler passage.

11. A vehicular a.c. generator as claimed in claim 1, wherein said housing comprises a cooling liquid passage adjacent said cooling surface.

* * * * *